Nov. 28, 1961     E. H. POVEY     3,011,123
METHOD AND APPARATUS FOR ADJUSTING VOLTAGE
RATIO AND PHASE RELATIONS
Filed Oct. 4, 1960     3 Sheets-Sheet 1

Inventor
Edmund H. Povey

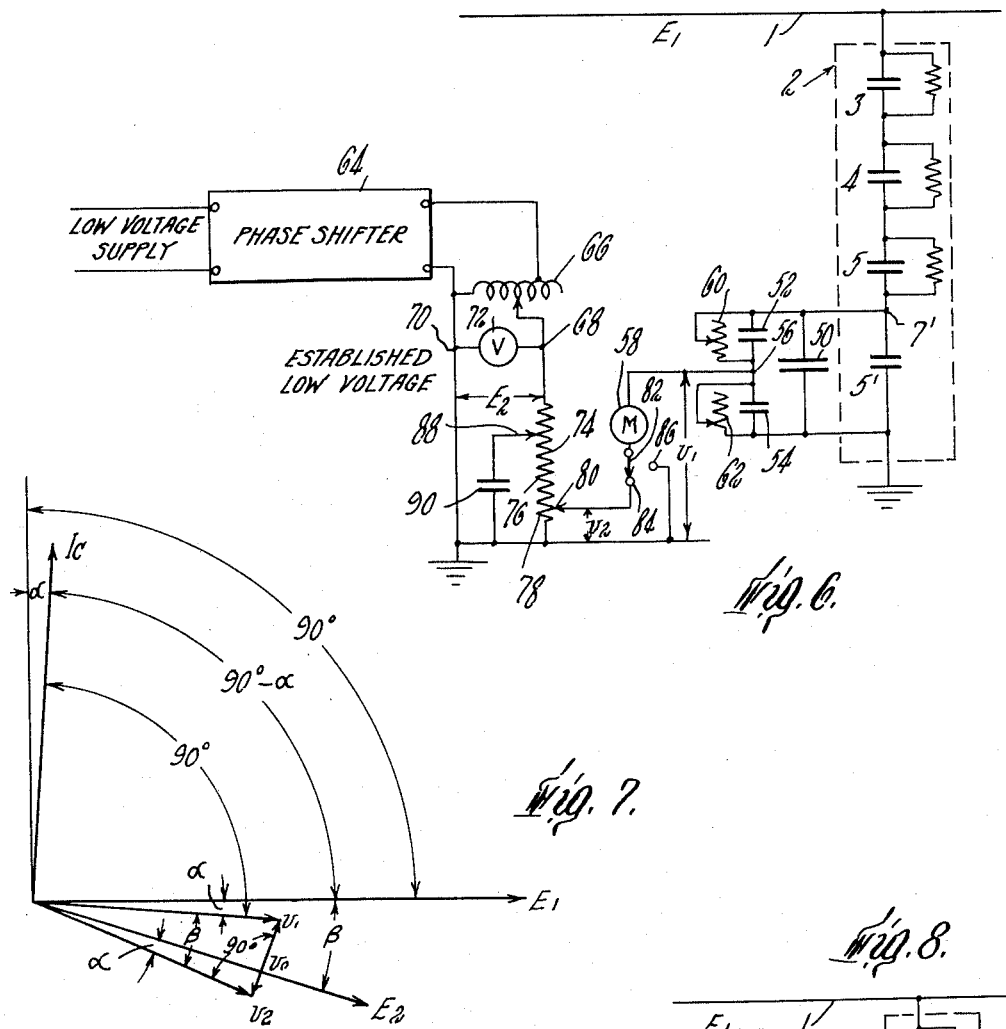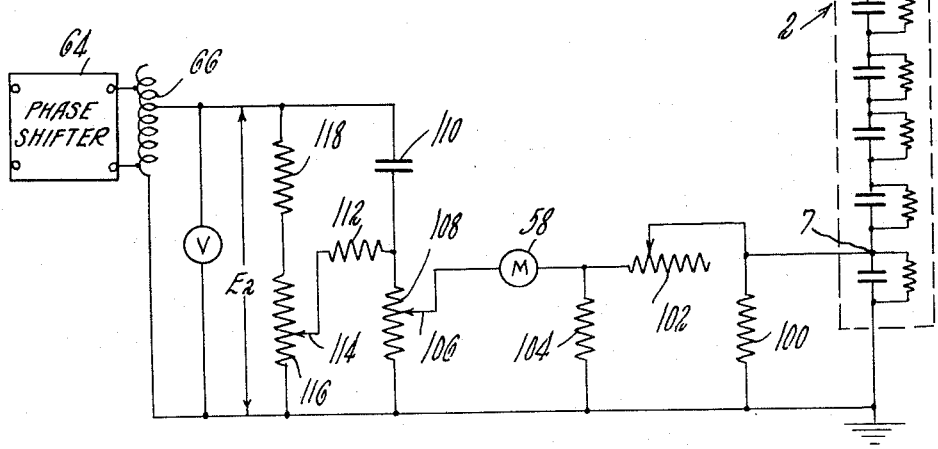

United States Patent Office 3,011,123
Patented Nov. 28, 1961

3,011,123
METHOD AND APPARATUS FOR ADJUSTING VOLTAGE RATIO AND PHASE RELATIONS
Edmund H. Povey, Medford, Mass., assignor to Doble Engineering Company, Belmont, Mass., a corporation of Massachusetts
Filed Oct. 4, 1960, Ser. No. 60,452
16 Claims. (Cl. 324—83)

This invention relates to apparatus and methods adapted for use on high voltage systems in general and, in particular, to apparatus and methods for determining the magnitude and phase relations between a given high voltage and a low voltage of the same frequency. When means are available to adjust the phase and magnitude of the low voltage, the invention is particularly applicable to the establishment of a low voltage having a desired phase and magnitude relation to the high voltage. In this case, the absolute value of the high voltage can be readily determined from a measurement of the low voltage. The apparatus and methods of this present invention are in the nature of improvements on the systems and elements thereof described in the Patents 2,922,951 and 2,922,952, issued January 26, 1960, in the names of Frank C. Doble and Edmund H. Povey et al. respectively.

In high voltage systems it is most important to know accurately the value of the high voltage inasmuch as measurements of electric power and energy and the proper operation of the relays and similar devices are dependent on it. The high voltage itself is much too high either to be measured directly or to be used to operate relays and similar devices. It is also unsafe to personnel who must handle meters and similar apparatus. Instead, the common practice is to reduce the high voltage to a low voltage, such as, for example 115 volts or thereabouts, that is suitable for use in the measuring instruments and the necessary controls of various kinds. To make accurate measurements and to have the controls operate properly, this low voltage must be substantially in phase with the high voltage and the magnitude relation between them must also be established.

In accordance with the invention, there is provided apparatus which makes use of an impedance device of known capacitance and phase angle such as a capacitive bushing to establish the magnitude and phase relations between the high voltage to which the impedance device is connected and a given low voltage. If the low voltage is adjustable the apparatus provided by the invention may be used to monitor the adjustment to obtain a predetermined magnitude ratio and phase relation with respect to the high voltage.

Accordingly, it is a primary object of this invention to provide apparatus for determining to a high degree of accuracy the phase and magnitude relations between a high voltage and a low working voltage.

Still another object of the invention is to provide apparatus of the above-mentioned kind having adequate provisions for grounding to insure safe and accurate operation unaffected by stray fields.

Still another object of this invention is to provide improved apparatus for establishing magnitude and phase relations between a high voltage and a low working voltage when the low working voltage is obtained from an amplifier deriving its input signal from an impedance device connected to the high voltage of the type described in Patent No. 2,922,952 for example. A form of the apparatus provided by this invention is capable of using the same impedance device which is furnishing the signal to the amplifier supplying the low working voltage.

Other objects and advantages of the invention will be seen as the following description of preferred embodiments thereof progresses in conjunction with the drawings, in which:

FIG. 6 is a schematic diagram of a second embodiment of the invention;

FIG. 7 is a vector diagram illustrating certain phase relationships that are present in the apparatus of FIG. 6; and FIG. 8 is a schematic diagram of an alternate form of the apparatus of FIG. 6.

Figure 1:
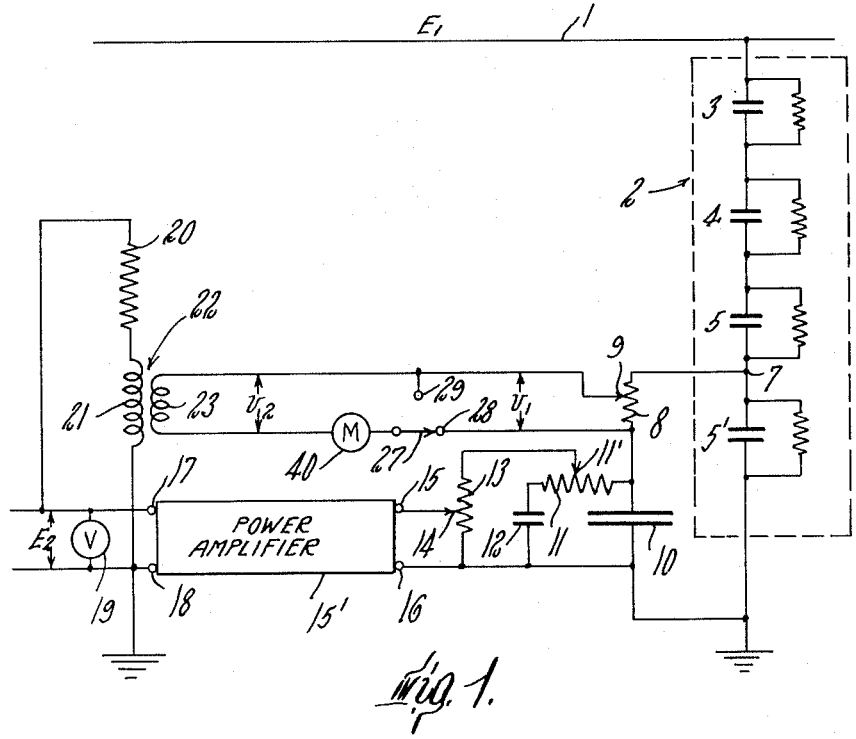
FIG. 1 is a schematic diagram of a first embodiment of the apparatus according to the invention.

With reference to FIG. 1 it will be seen that the numeral 1 refers to one conductor of a high voltage power line which has a voltage of $E_1$ volts above ground, and the numeral 2 refers to a grounded capacitive impedance device, such as a high-voltage bushing which includes capacitor sections 3, 4, 5 and 5' in series with one another. Each capacitor section is shown as having an associated shunt resistor which is symbolic of its leakage resistance. The grounded capacitor section 5' is provided with a tap at point 7. Devices of this kind are well known and are available commercially. Actually, they may have many more capacitor sections than the four that have been shown but this is immaterial as regards to the principles of the invention and it is believed that the invention can be properly understood with this simplified showing of the capacitive impedance device. Connected between the top 7 and ground is a potentiometer 8 having a movable tap 9, in series with a capacitor 10 having a capacitance value which is large compared with that of either impedance device 2 or its section 5'. The resistance of potentiometer 8 is small as compared with the impedance of the impedance device 2 and its resistance between the movable contact member 9 and its junction with capacitor 10 will be hereinafter referred to as $R_1$ ohms.

Coupled to capacitor 10 is a phase shifting network consisting of a potentiometer 11 (having a tap 11') and a capacitor 12 disposed in series relationship across capacitor 10. The movable contact 11' is connected to one end of still another potentiometer 13, the other end of which is grounded. Potentiometer 13 has a movable contact 14 connected to one input terminal 15 of a high quality power amplifier 15' which may be of the type disclosed in the aforementioned Patent No. 2,922,952. The other input terminal 16 of the amplifier 15' is grounded. Power for the amplifier may be supplied by any suitable low voltage source such as the usual 115 volt outlet or even from a battery. At the output terminals 17, 18 of the amplifier, the latter of which is grounded, there is provided an output voltage designated $E_2$ which is measured by a voltmeter 19. Connected across terminals 17, 18 is a series combination of a high valued resistor 20 and the primary 21 of a mutual inductor 22. One end of the secondary 23 of the mutual inductor 22 is connected to the movable contact 9 of potentiometer 8 and the other end is connected through a meter 40 and switch 27 to the junction point between potentiometers 8 and 11. The meter 40 may be a sensitive millivoltmeter or a suitable vacuum tube voltmeter which should have a high input impedance so that appreciable current is not drawn, thus avoiding the introduction of current errors.

Figure 2:
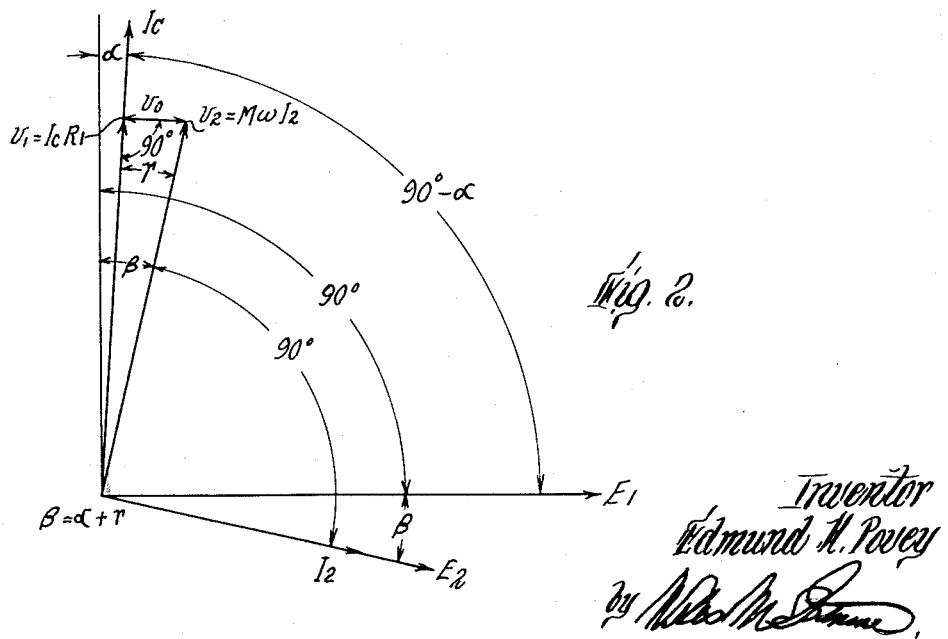
FIGS. 2 and 3 are vector diagrams illustrating certain phase relationships that are present in the apparatus of FIG. 1.

A vector diagram illustrating the phase relationships which exist in the circuitry of FIG. 1 is shown in FIG. 2. No attempt has been made to draw the vectors to scale but only to indicate them so that they may best illustrate the vector relationship. The high voltage $E_1$ on line 1 is represented by the horizontal vector and the established low voltage $E_2$ at the output of the power amplifier 15 is shown as lagging $E_1$ in phase by the angle $\beta$. (Although $E_2$ is shown as lagging $E_1$ it could equally well be leading $E_1$.) The current from the high voltage line 1 through the impedance device 2 is represented by the vector $I_C$. Were the impedance device a perfect capacitor, the current $I_C$ would lead the high voltage $E_1$ by an angle of 90° but since there are leakage resistance losses in the device the angle between $I_C$ and $E_1$ is $(90° - \alpha)$, where $\alpha$ is the defect angle of the impedance device. The current which flows from the low voltage conductor through resistor 20 and the primary 21 of the mutual inductor 22 is represented by the vector $I_2$ and is shown as being in phase with the voltage $E_2$. This is substantially accurate as the resistance R of resistor is so high relative to the reactance of the primary winding 21 that $I_2$ is practically in phase to $E_2$. The voltage $v_2$, induced in the secondary 23 of mutual inductor 22 is equal to $M\omega I_2$, where M is the mutual inductance in henries of the inductor and $\omega$ equals $2\pi f$ where $f$ is the frequency. $v_2$ leads $I_2$ by 90° as indicated in the vector diagram of FIG. 2.

The capacitance value of capacitor 10 and the resistance value of potentiometer 8 are selected so that their combined impedance is negligible compared to that of capacitor section 5' so that the current $I'_C$ in the circuit consisting of potentiometer 8 and capacitor 10 is substantially equal to the impedance current $I_C$. Accordingly, the voltage drop $I'_C R_1$ which equals $v_1$ (the voltage drop across the resistor between switch points 28 and 29) is practically in phase with $I_C$. Thus $v_1$ is substantially equal to $I_C R_1$. It will thus be seen that with the switch 27 in the position shown in FIG. 1 the meter 40 reads the vector voltage difference between the voltages $v_1$ and $v_2$ which voltage difference is indicated as $v_0$ in FIG. 2 (the phase difference between $v_1$ and $v_2$ being indicated by the angle $\gamma$).

Accordingly, if the voltage $v_1$ is adjusted by the movement of the tap 9 until the meter reading is a minimum, $v_0$ is then at angle 90° with $v_1$ and at that point the sin $\gamma$ equals $v_0/v_2$.

The vector relations of the several voltages and currents are then as shown with the voltage $E_2$ lagging voltage $E_1$ by the angle $\beta$ where $\beta$ equals $\alpha$ plus $\gamma$. If it is desired to bring $E_2$ into phase with $E_1$ the phase shifting network comprising the potentiometer 11 and capacitor 12 is adjusted until the meter 40 indicates the equivalent phase angle of (minus $\alpha$) (the known defect angle) at which time $\beta$ will be zero and $E_1$ will be in phase with $E_2$.

Figure 3:
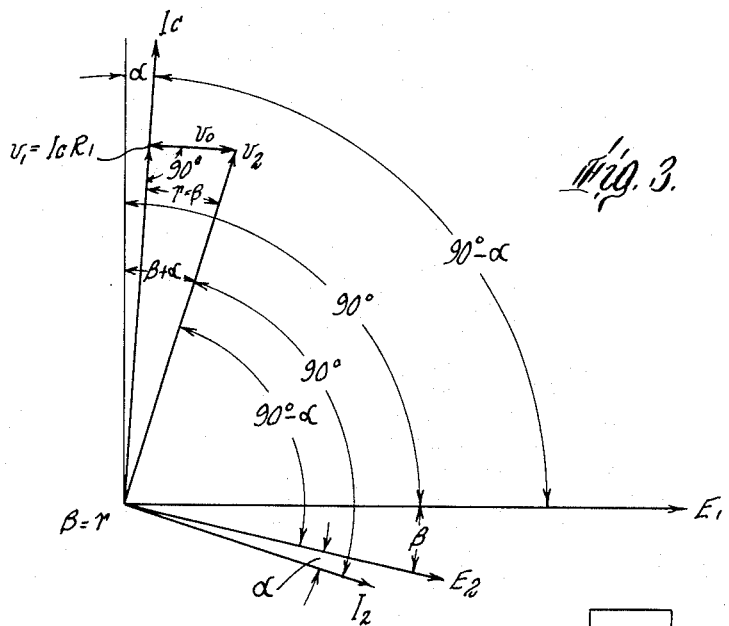
Figure 4:
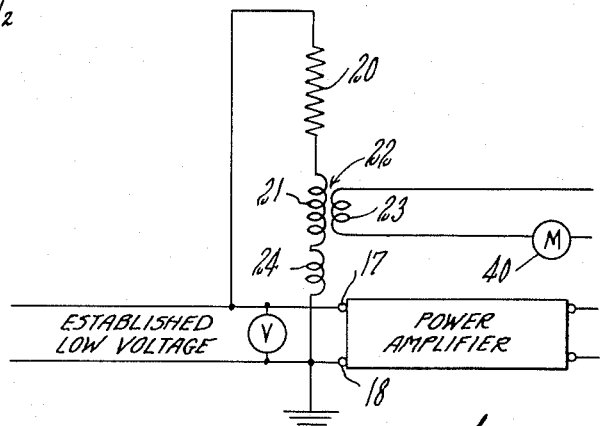
FIGS. 4 and 5 are schematic diagrams of certain modifications of the apparatus of FIG. 1.
Figure 5:
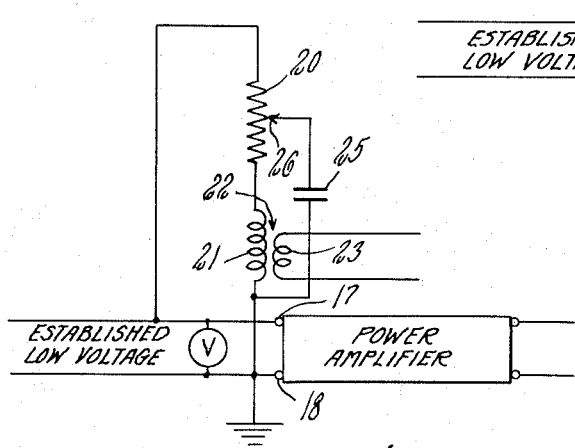

However, the determination of the phase relation between the voltages $E_1$ and $E_2$ can be greatly simplified if compensation is introduced in the apparatus to eliminate the effect of the fixed angle $\alpha$ from the computations so that the reading of the meter is a function of the angle $\gamma$ only. In such case when the voltage $E_2$ is brought into phase with the voltage $E_1$ the meter 40 reads zero. The effect of the angle $\alpha$ can be eliminated if the voltage $v_2$ is shifted by the angle $\alpha$ in a clockwise direction. This shift can be accomplished by causing $I_2$ to lag $E_2$ by the angle $\alpha$, as shown in FIG. 3. One method of accomplishing this result is to insert an inductance 24 in series with the series circuit of resistor 20 and the primary 21 of the inductor 22 as shown in FIG. 4 (only the portion of the circuit of FIG. 1 to the left of the amplifier input terminals being repeated in FIG. 4). As the angle of lag $\theta$ introduced by the inductance 24 is equal to $\omega L/R_2$ ($R_2$ being the value of resistor 20 and equal to 50,000 ohms, for example, as is convenient in this circuitry) would require approximately a 2.3 henries inductance to shift the current $I_2$ 1° relative to the voltage $E_2$. This 1° shift corresponds to a power factor of 0.0175, which is almost the upper limit of power factors associated with the bushings. However, a calibrated variable inductor in this range is difficult to produce and its output voltage would be influenced by stray magnetic fields which could readily introduce errors in the measuring circuit. A preferable method is to shunt a selectable portion of resistor 20 with a small capacitor 25 as shown in FIG. 5. Capacitor 25 can be made sufficiently small that it does not affect the magnitude of the current $I_2$. I have found that, with an established voltage of $E_2$ of 100 volts at a frequency of 60 cycles per second, a capacitance value for capacitor 25 of 0.003 microfarad with a 50,000 ohm resistor 20 and with the capacitor 25 shunting about 80% of potentiometer 20, the phase angle of the current $I'_2$ in the inductor primary 21 with respect to the voltage $E_2$ will be in the order of 0.5° corresponding to a power factor of 0.01. This latter value I have found to be compatible with the maximum defect angles of bushings commonly utilized in high voltage systems. Moreover the current $I_2$ taken by such a capacitor is so small, relatively speaking, and is so nearly in quadrature with the current $I_2$ that $I'_2$ is substantially equal to $I_2$ in magnitude.

If we eliminate the effect of angle $\alpha$, then the minimum voltage $v_0$ divided by $v_2$ is the sin $\beta$, or $\beta = $ arc sin $v_0/v_2$. If in FIG. 2 we had assumed that $E_2$ led instead of lagged $E_1$ by angle $\beta$, we would also obtain the same minimum reading $v_0'$. To determine whether $v_0'$ leads or lags, let it be assumed that the sliding contact 26 of potentiometer 20 as shown in FIG. 5 is in the position which gives exact compensation for the angle $\alpha$. If the sliding contact 26 is moved downwardly a small amount the capacitor 25 will be shunted across less of the resistor 20 and will cause a change in the phase angle shift in a clockwise direction so that the current $I'_2$ now lags voltage $E_2$ by an angle greater than $\alpha$. A study of FIG. 3 shows that the phase position of the voltage $v_2$ will likewise be caused to shift in a clockwise direction increasing the angle $\gamma$ and also the voltage $v_0$ as read on the meter 40 will increase. However if the voltage $E_2$ was leading voltage $E_1$ when the current $I'_2$ was shifted in a clockwise direction by the downward movement of the contact 26 the angle $\gamma$ and the reading $v_0$ on the meter would decrease. It follows that the sense of the change or direction of change in the meter indication when the position of contact 26 can be used to determine the sense of the phase difference between the voltages $E_1$ and $E_2$.

The ratio of the voltages $E_1$ and $E_2$ is now readily determinable. This ratio conventionally is most conveniently measured when $E_2$ is brought into phase with $E_1$ by the methods above described. The quantities M, $R_2$, and $C_1$ are all fixed so that their value can be determined. As is apparent, the resistor 8 ($R_1$) may be of the dial type, and the dial can be calibrated to read ratio directly. When $R_1$ is adjusted so that meter 40 reads zero, $v_1$ equals $v_2$ and $E_2$ is in phase with $E_1$.

The relation between the ratio and $R_1$ is derived as follows:

$$I_C = E_1 \omega C_1 \quad (1)$$
$$v_1 = I_C R_1 \quad (2)$$
$$v_1 = E_1 \omega C_1 R_1 \quad (3)$$

$$I_2 = \frac{E_2}{R_2} \quad (4)$$

$$v_2 = M\omega I_2 \quad (5)$$

$$v_2 = \frac{M\omega E_2}{R_2} \quad (6)$$

Setting $v_1 = v_2$ from (3) and (6)

$$E_1 \omega C_1 R_1 = \frac{M\omega E_2}{R_2} \quad (7)$$

or ratio $$\frac{E_1}{E_2} = \frac{M}{C_1 R_1 R_2} = \frac{K}{R_1} \quad (8)$$

where $$K = \frac{M}{C_1 R_2} \qquad (9)$$

In case $E_1$ and $E_2$ are not in phase but have a phase angle $\beta$ between them, the ratio given by (8) must be modified to ratio $$\frac{E_1}{E_2} = \frac{K}{R_1} \cos \beta$$

A second embodiment of the phase and magnitude compensating system according to the invention is shown in FIG. 6. In that figure, as in FIG. 1, the numeral 1 is utilized to indicate the high voltage power line which has a voltage $E_1$ volts above ground potential. Numeral 2 designates the capacitive impedance device such as a bushing which includes capacitive sections 3, 4, 5 and 5' connected in series. These sections each have small leakage resistances but together the sections provide an impedance which is largely capacitive. As in FIG. 1 the grounded section 5' is provided with a voltage tap 7'.

A capacitor 50 of high quality and known value having a large value in relation to that of the impedance device 2 is connected between voltage tap 7' of the impedance device and ground across the capacitor unit 5'. With a convenient value for this capacitor, 50, the voltage across it may well be in excess of that required by measuring instruments. Therefore, to obtain a sufficiently low voltage, a voltage divider circuit comprising capacitors 52 and 54 is connected across the capacitor 50. The capacitance of this divider arrangement is preferably very small compared with that of capacitor 50. Connected to the junction 56 between the capacitors 52 and 54 is a measuring circuit which includes a meter 58. By suitable proportioning of the capacitors 52 and 54 the voltage ($v_1$) between junction 56 and ground may be adjusted to the suitable value for the range of the associated measuring apparatus. I have found that, for example, a convenient value for capacitor 50 is ten microfarads, for capacitor 52, 0.02 microfarad and for capacitor 54, two microfarads. There are also provided across each capacitor 52, 54 variable resistors 60, 62 respectively of relatively high value, the purpose of which will be explained later.

The low voltage to be related in magnitude and phase to the high voltage $E_1$ is obtained from a low voltage supply which has the same frequency as the high voltage line. This supply might be provided with means for adjusting the phase of the low voltage such as phase shifter 64 and the magnitude of this voltage may be adjustable for example by means of an autotransformer 66. The useful low voltage output $E_2$ is available between the terminals 68 and 70 across which is shown connected a voltmeter 72.

A high resistance potentiometer 74 is connected across the terminals and is divided into two sections 76, 78 by its movable contact 80. The tap 80 is connected to meter 58 through a switch 82 having contacts 84, 86. As the voltage required to operate meter 58 is very low, the resistance of section 78 is very low compared with the resistance of section 76 so that the voltage between contact 80 and ground ($v_2$) is but a fraction of the voltage $E_2$. The input resistance of the meter 58 is preferably very high so that any current that it may draw is very small and will produce little disturbance on the voltages at points 56 and 80.

If the capacitors 50, 52, 54 were perfect (loss free) the voltage $v_1$ appearing between junction 56 and ground would lag the current $I_C$ by exactly 90°. However, since practical capacitors do have some losses it is necessary to adjust the resistors 60, 62 to establish a 90° relation between the voltage $v_1$ and current $I_C$. Proper adjustment of these components can be easily made in the laboratory since they are small in size and low in voltage rating.

If the impedance device was loss free, as indicated above, $I_C$ would lead the high voltage $E_1$ by 90° and $E_2$ could easily be adjusted to be in phase with $E_1$. Since the impedance device does have losses however, as indicated in FIG. 6, $I_C$ will lead the voltage $E_1$ by an angle (90°−α) (where α is the defect angle of the impedance device). These relations are shown in the vector diagram of FIG. 7 in which no attempt is made to draw the vectors to scale. The high voltage vector $E_1$ is horizontal and the current $I_C$ leads $E_1$ by the angle 90°−α degrees, departing from the 90° rotation by α degrees where α is the defect angle of the impedance device. The resistors 60 and 62 have been adjusted so that the voltage between tap 56 and ground lags $I_C$ by 90°. The voltage $E_2$ is shown lagging $E_1$ by β degrees. Without any compensation the voltage between tap 80 and ground is in phase with $E_2$ and can be represented by $v_2$ in FIG. 7. The meter 58 measures the vector difference between $v_1$ and $v_2$. If the contact 80 is adjusted so that the meter 58 reads a minimum a study of FIG. 7 shows that this meter reading divided by $v_1$ is equal to $\sin(\beta-\alpha)$. In order to make the indication of the meter 58 dependent on β only and independent of α compensation must be introduced. In one method resistor 62 might be adjusted to bring $v_1$ into phase with $E_1$. However I prefer to compensate for the defect angle of the impedance device by causing a compensating shift in voltage $v_2$, the voltage between the tap 80 and ground. It will be recalled that the voltage $v_2$ is a fraction of $E_2$ changed in magnitude but not in phase by the potentiometer 74. In order to accomplish this phase shift the potentiometer 74 may be tapped at point 88 and a capacitor 90 connected between the tap and ground and the capacitor being adjusted so that $v_2$ lags $E_2$ by the angle α. This phase relation is shown in FIG. 7. To accommodate the measuring circuit or to enable the measuring circuit to be used with impedance devices of differing defect angles I prefer to use a fixed capacitor 90 and to vary the position of tap 88. The position of this tap can be conveniently calibrated in terms of the defect angle (α) or in the power factor ($\sin \alpha$) of the impedance device.

In operation, let it be assumed that the ratio of the voltage $E_1$ and $E_2$ will be determined after the low voltage has been brought to a desired magnitude by adjustment of the autotransformer 66. The magnitude is most readily determined while $E_2$ is in phase with $E_1$. To accomplish this the movable contact 80 and the phase shifter 64 are alternately adjusted until the reading on the meter 58 equals zero indicating that the vector difference ($v_0$) between the voltages $v_1$ and $v_2$ is likewise equal to zero. It then becomes possible to determine the voltage ratio $E_1/E_2$ directly.

Let the total resistance of potentiometer 74 be $R_2$ ohms and that of section 78 be $R_1$ ohms; the total capacitance of the impedance device be $C_1$; the capacitance of capacitor 50 be $C_2$ and the capacitive values of capacitors 52 and 54 be $C_3$ and $C_4$ respectively. Then the voltage $$E_2 = v_2 \frac{R_2}{R_1} = \frac{K_2}{R_1} v_2 \text{ where } K_2 = R_2 \qquad (1)$$

The voltage $v'$ across capacitor 50 is given by $$v' = v_1 \frac{C_3 + C_4}{C_3} \qquad (2)$$

If the equivalent series capacitance of capacitors 52 and 54 is negligible compared with the capacitance $C_2$ of capacitor 50, the high voltage $$E_1 = v' \frac{C_1 + C_2}{C_1} = v_1 \left(\frac{C_3 + C_4}{C_3}\right) \left(\frac{C_1 + C_2}{C_1}\right) = K_1 v_1 \qquad (3)$$

where $$K_1 = \frac{(C_1 + C_2)(C_3 + C_4)}{C_1 C_3}$$

When $E_1$ and $E_2$ are in phase, $v_2$ may be made equal to $v_1$ by adjusting $R_1$ until meter 58 indicates zero voltage. Then from (1) and (3), ratio $$\frac{E_1}{E_2} = \frac{K_1}{K_2} R_1 \qquad (4)$$

If the capacitance of capacitors 52 and 54 in series is not negligible in comparison with $C_2$, their equivalent series value may be added to $C_2$. If the actual value of the high voltage $E_1$ is desired, the voltage $E_2$ may be read on the voltmeter 72 connected to measure $E_2$ and multiplied by the ratio as given by Equation 4.

It may also be desirable to know the phase angle $\beta$ between the low voltage $E_2$ and the high voltage $E_1$ when they differ in phase. For example, the voltage $E_2$ may be supplied directly by a potential device or the secondary of a potential transformer whose phase shift characteristics it is desired to determine. For this purpose the tap 80 is moved until the meter 58 (with the switch 82 connected to contact 84) reads a minimum voltage. Under these conditions the voltage difference $v_0$ is perpendicular to the voltage $v_2$ so that the sin $\beta = v_0/v_1$. A convenient method for making this measurement is to supply the meter 58 through an amplifier. The switch 82 is first thrown to position 86 and the amplifier is adjusted until the meter reads full scale. The switch is then thrown to position 84 and when tap 80 is adjusted to give a minimum reading, this reading read as a fraction of full scale is a direct reading of the sine of angle $\beta$.

An alternate embodiment of this device is shown in FIG. 8. In that figure a 10 ohm coupling resistor 100 is used at the bushing tap. As the power factor of capacitors of the necessary rating (capacitor 50 in FIG. 6, for example) changes somewhat with temperature it is preferred to use the resistance system shown in FIG. 8 rather than the capacitance system of FIG. 6. The method of balancing this system is the same as above described in connection with FIG. 6. In practice the low voltage $E_2$ can usually be varied both in phase and in magnitude by suitable means, such as phase shifter 64 and autotransformer 66. If the phase cannot be adjusted the voltage may be adjusted in magnitude by means of the autotransformer until the meter 58 reads a minimum as above described. In the system shown in FIG. 8 the variable resistor 102 has a maximum resistance of 100 ohms and is calibrated directly to provide an indication of the system potential ratio. A 40 ohm resistor 104 is connected between the potentiometer 102 and ground. The meter 58 is connected to a potential tap 106 on the 40 ohm potentiometer 108 which provides an adjustment for the capacitance of the bushing and may be calibrated for example for values 0–1000 micromicrofarads. A 0.1 microfarad capacitor 110 is connected between the ungrounded side of $E_2$ and the top terminal of potentiometer 108. From the junction between the capacitor 110 and potentiometer 108 a 250,000-ohm resistor 112 is connected to a tap 114 on a second potentiometer 116. This potentiometer is a 2500 ohm unit connected in series when a 10,000 ohm resistor 118 and this potentiometer adjustment provides means for adjusting the circuitry for the power factor of the bushing (calibrated for 0–2 percent power).

Thus it will be seen that this invention provides apparatus which enables the accurate establishment of magnitude and phase relations between a given low voltage and a high voltage so that two voltages may be placed in a known phase relation relative to each other and the magnitude of the low voltage may be properly adjusted so that that voltage may be used for operating various meters and other control equipment. This apparatus avoids the need to use a potential transformer which is an expensive device and provides a compact and reliable apparatus capable of being used to provide a useful low voltage accurately related to a high voltage for use in power systems. Various modifications of the circuitry will occur to those skilled in this art. Therefore while preferred embodiments of the invention have been shown and described it is not intended that the invention be limited thereto or to details thereof and departures may be made therefrom within the spirit and scope of the invention as defined in the claims.

I claim:

1. Apparatus for use in combination with an impedance device of known capacitance and defect angle in high voltage service to establish a low working voltage in a given magnitude and phase relation to the high voltage, said apparatus comprising a voltage dividing circuit connected between a point of relatively low potential on said impedance device and ground to provide a first reference voltage from said voltage dividing circuit, means to provide a second reference voltage having known phase and magnitude relations to said low working voltage, means to adjust the phase of one of said reference voltages, means to adjust the magnitude of one of said reference voltages, and means to compare the magnitude and phase of said first and second reference voltages.

2. Apparatus for use in combination with an impedance device of known capacitance and defect angle in high voltage service to establish a low working voltage in a given magnitude and phase relation to the high voltage, said apparatus comprising a first resistive element connected between a point of relatively low potential on said impedance device and ground, a series circuit including a second resistive element and the primary winding of a mutual inductor energized by the low working voltage, the resistance of said second resistive element being substantially higher than the impedance of said primary winding, and a voltage sensitive meter connected in circuit with the secondary winding of said mutual inductor and the first resistive element to measure the difference between the voltages developed thereacross.

3. Apparatus as claimed in claim 2, including a reactive element connected to the resistive element in said series circuit for producing variations in the phase of the voltage developed across the secondary winding of said mutual inductor.

4. Apparatus as claimed in claim 3 wherein the resistive element in said series circuit consists of a potentiometer having its movable contact connected to said reactive element.

5. Apparatus for use in combination with an impedance device of known defect angle in high voltage service to establish a low working voltage in a given magnitude and phase relation to the high voltage, said apparatus comprising a voltage dividing circuit connected between a point of relatively low potential on said impedance device and ground, a power amplifier having input and output circuits, a phase and magnitude adjusting network connected to said voltage dividing circuit to apply a first portion of the voltage developed thereacross to the input circuit of said amplifier, and means to compare the magnitude and phase of a second portion of the voltage developed across said voltage dividing circuit with the voltage developed across the output circuit of said amplifier.

6. Apparatus for use in combination with an impedance device of known capacitance and phase angle connected to a high voltage for establishing a low working voltage having known magnitude and phase relationship to said high voltage, said apparatus comprising a first impedance network having an impedance that is small in comparison with the impedance of said impedance device and including a first resistor connected in circuit between a point of relatively low potential on said impedance device and ground, said impedance device and first network comprising a voltage divider circuit which produces across said first resistor a first reference voltage of known magnitude and phase relation to said high voltage, phase shifting means adapted to be connected to a source of low voltage to provide a second reference voltage, means to adjust the magnitude of said second reference voltage and means for comparing the magnitude and phase of said first and second reference voltages.

7. Apparatus for use in combination with an impedance device of known capacitance and phase angle connected to a high voltage to determine the magnitude and phase relations between said high voltage and a low working voltage, said apparatus comprising a first impedance network connected between a point of relatively low potential on said impedance device and ground and arranged to provide a first reference voltage of known magnitude and relation to said high voltage, a second impedance network connected to said low working voltage to provide a second reference voltage of known magnitude and phase relation to said low working voltage, and means to compare the magnitude and phase of said first and second reference voltages.

8. The apparatus as claimed in claim 7 wherein said first and second impedance networks are connected to a common ground so that said first and second reference voltages have a common reference point.

9. The apparatus as claimed in claim 7 and further including calibrated magnitude adjustment means associated with one of said impedance networks adapted to compensate for the differences in capacitance of various impedance devices to which the apparatus may be connected.

10. The apparatus as claimed in claim 7 and further including a calibrated phase adjustment means associated with one of said impedance networks adapted to compensate for the differences in the phase angle of various impedance devices to which the apparatus may be connected.

11. The apparatus as claimed in claim 7 and further including means for varying the magnitude of one of said reference voltages and means for measuring the voltage difference between said one reference voltage and the other reference voltage.

12. Apparatus for use in combination with an impedance device of known capacitance and phase angle connected to a high voltage to determine the magnitude and phase relation between said high voltage and a low working voltage, said apparatus comprising a first circuit having an impedance small in comparison with the impedance of said impedance device, and including a first resistor connected in circuit between a point of relatively low potential on said impedance device and ground, said impedance device and first circuit comprising a voltage divider producing across said first resistor a first reference voltage in known magnitude and phase relation to said high voltage, a second circuit including a mutual inductor having a primary connected across said low working voltage and a secondary, a second resistor in circuit with said primary of a mutual inductor connected across the low working voltage, said second resistor having a high resistance in comparison with the inductive impedance of the primary of said mutual inductor producing in the secondary of said mutual inductor a second reference voltage of known magnitude and phase relation to said low working voltage and means for comparing the magnitude and phase of said first and second reference voltages.

13. The apparatus as claimed in claim 12 wherein a first terminal of the secondary of said mutual inductor is connected to a first terminal of said first resistor and said comparing means includes means for measuring the potential difference between the second terminal of said mutual inductor and the second terminal of said first resistor.

14. The apparatus as claimed in claim 12 and further including a capacitive element connected in shunt across the series combination of a portion of said second resistance and the primary of said mutual inductor, said capacitive element being arranged to enable adjustment of the phase of said second reference voltage to compensate for the defect angle of said impedance device.

15. Apparatus for use in combination with an impedance device of known capacitance and phase angle connected to a high voltage for determining the magnitude and phase relation between said high voltage and a low working voltage, said apparatus comprising a first impedance network including a first resistance connected in circuit between a point of relatively low potential on said impedance device and ground to produce a first reference voltage which leads said high voltage by approximately 90°, means to provide a low working voltage, a resistive capacitive network connected to said working voltage arranged to produce a second reference voltage which leads said working voltage by the same phase angle as said first reference voltage leads said high voltage, means to shift the phase of one of said first and second reference voltages to bring it into phase with the other reference voltage and means for determining the ratio of said high voltage and said working voltage when said first and second reference voltages are in phase.

16. Apparatus for use in combination with an impedance device of known capacitance and phase angle connected to a high voltage for determining the magnitude and phase relation between said high voltage and a low working voltage, said apparatus comprising a first impedance network including a first resistance connected in circuit between a point of relatively low potential on said impedance device and ground to produce a first reference voltage which leads said high voltage by approximately 90°, means to provide a low working voltage, a resistive capacitive network connected to said working voltage arranged to produce a second reference voltage which leads said working voltage by the same phase angle as said first reference voltage leads said high voltage, means to shift the phase of one of said reference voltages to compensate for the defect angle of said impedance device and means to adjust the magnitude of one of said reference voltages to compensate the capacitance of said impedance device.

References Cited in the file of this patent
UNITED STATES PATENTS 2,600,204     Carleton _____ June 10, 1932
2,756,414     Doremus _____ July 24, 1956